3,211,582
HARD-FACING ELECTRODE
Rene D. Wasserman, Stamford, Conn., and Joseph F. Quaas, Island Park, N.Y., assignors to Eutectic Welding Alloys Corporation, Flushing, N.Y., a corporation of New York
Filed Jan. 3, 1962, Ser. No. 164,100
10 Claims. (Cl. 117—205)

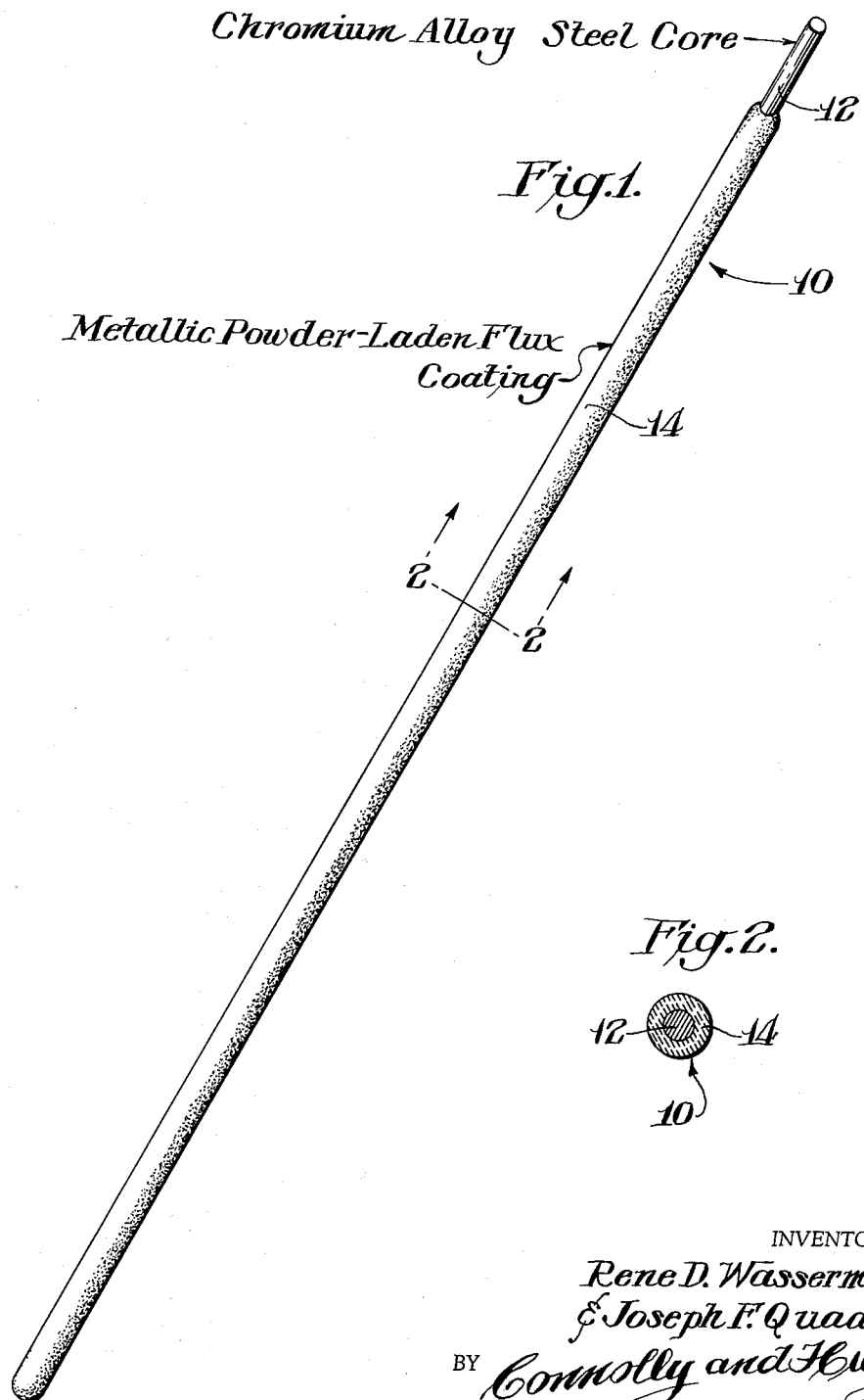

This invention relates to a flux-coated hard-facing arc welding electrode, and it more particularly relates to such an electrode having a metallic powder-laden flux coating.

An object of this invention is to provide an arc welding electrode for hard-facing applications providing a smooth facing of moderate hardness and good impact, wear, and corrosion resistance.

In accordance with this invention an electrode incorporates a stainless steel core coated with a metallic powder-laden flux coating. The core wire incorporates a chromium content ranging from 23–28% by weight and up to 6% of nickel. The flux coating incorporates active fluxing agents with a total carbon content in carbide or uncombined form ranging from 3–20% and a powdered metallic alloy content of relatively high percentage ranging from 30–55% by weight of the flux. This flux coating is combined with a binder, such as one of the conventional water-soluble silicate type, ranging approximately from 8–25% by weight of the overall flux and binder composition. The formulation is applied in relatively high percentages with respect to the electrode core ranging from 45–50% by weight of the finished product, the flux-coated electrode.

The relatively high percentage of metallic powder in a relatively high flux percentage relative to core metal helps to rapidly deposit a very smooth facing upon ferrous base materials such as stainless, mild low alloy, straight chromium stainless and chromium nickel stainless steels. This facing is wear resistant, and its hardness is approximately 40–55 Rockwell C. The facing also exhibits a very low coefficient of friction which heightens its wear resistance. The facing deposited by the electrode of this invention is extremely wear-resistant primarily as a result of its incorporation of refractory carbides such as those of chromium, manganese, silicon, and titanium.

Novel features and advantages of the present invention will become apparent to one skilled in the art from a reading of the following description in conjunction with the accompanying drawings wherein similar reference characters refer to similar parts and in which:

FIG. 1 is a perspective view of one embodiment of this invention; and

FIG. 2 is a cross-sectional view taken through FIG. 1 along the line 2—2.

In FIGS. 1 and 2 is shown an arc welding electrode 10 incorporating a core 12 and a metallic powder-laden and flux coating 14 of the latter described composition. The core wire is a steel incorporating substantial amounts of chromium which characterizes it as a stainless steel. The chromium content ranges from approximately 23–28% by weight, and up to 6% of nickel may also be utilized. A typical commercial type 446 stainless steel rod may be accordingly utilized. The flux coating applied upon such a rod may be formulated in accordance with the following table which provides ranges of percentages by weight for each of the constituents and a particularly effective example.

ACID BASE FLUX COATING FORMULATION

| Constituent | Range | Example |
|---|---|---|
| (1) Titanium dioxide | 20–40 | 33 |
| (2) Alkaline earth metal carbonates | 8–20 | 13 |
| (3) Alkali or alkaline earth metal fluorides, particularly fluorspar (calcium fluoride), sodium fluoride or potassium fluoride | 0–10 | 2 |
| (4) Aluminum silicate | 0–10 | 1 |
| (5) Total carbon content in carbide and uncombined form | 3–20 | 4 |
| (6) Powdered metallic materials | 30–55 | 35 |
| (7) Silica | 6–15 | 12 |

A particularly effective alkaline earth carbonate for use as constituent (2) is calcium carbonate. The aluminum silicate of constituent (4) may be the compound itself or in the conveniently available mineral form of mica, bentonite, or clay. The carbon of constituent (5) may be any convenient form of that common substance such as graphite, coal, etc., and the silica of constituent (7) is, for example, any available commercial grade of $SiO_2$.

The powdered metallic material of constituent (6) may be selected from any of the following metallic powders and its particle size ranges, for example, from 20 to 325 mesh.

Metallic powders (1) Ferrochrome
(2) Chromium
(3) Chromium-carbide
(4) Manganese
(5) Ferrosilicon
(6) Ferrotitanium
(7) and mixtures thereof The above formulation is of the acid type in contrast to the following example of a flux of the lime base type.

LIME BASE FLUX COATING FORMULATION

| Constituent | Range | Example |
|---|---|---|
| (1) Alkaline earth metal carbonates such as calcium carbonate, sodium carbonate and potassium carbonate, preferably calcium carbonate | 15–40 | 30 |
| (2) Alkali and alkaline earth metal fluorides, particularly fluorspar (calcium fluoride), sodium fluoride or potassium fluoride | 15–40 | 23 |
| (3) Aluminum silicate | 0–10 | 8 |
| (4) Total carbon content in carbide and uncombined form | 3–20 | 4 |
| (5) Powdered metallic alloys | 30–55 | 35 |

The same remarks regarding the constituents of the acid base flux coating formulation also apply to the lime base flux coating formulation except where specifically stated otherwise.

Chromium, chromium-carbide and manganese powders are particularly effective in this type of flux. The flux is combined with from 8–25% of binder stated as a percentage of the overall flux of active fluxing agent and binder, and it is coated in rather heavy amounts upon the aforementioned type of core to provide a flux percentage of from 45–50% by weight of the resultant electrode. A coating of this type provides, for example, on a ⅛ inch diameter core an outside diameter of approximately 0.245 inch and on a 5/32 of an inch core, an outside diameter of 0.295 inch. These resultant diameters are considerably greater than conventional diameters for such service. A particularly effective electrode in accordance with this invention utilizes a core wire containing approximately 25% chromium, 4% nickel and the balance iron. The flux coating is, for example of the acid base type and incorporates the percentages recited in the aforementioned example of such a flux coating formulation with constituent (2) being calcium carbonate, constituent (4) being bentonite, constituent (5) being coke and constituent (6) being composed of substantially equal amounts of chromium, chromium-carbide and manganese powders of approximately 100 mesh particle size. These active agents are combined with binder to form a resultant acid flux coating which incorporates approximately 15% of sodium and potassium silicates of the overall flux composition. This coating is applied to form a flux coating of approximately 0.245 inch outside diameter upon a ⅛ inch core wire of the aforementioned composition.

This electrode rapidly deposits a highly alloyed bead or facing having the aforementioned advantageous properties upon the aforedescribed ferrous materials with a composition as indicated, which is unexpectedly effective to provide the properties described. The exact reason why this electrode is able to provide such a remarkably effective hard facing is not completely understood; however, its constituents are unusually synergistic in facilitating the incorporation of unprecedented percentages of flux with respect to core metal and metallic powder with respect to flux content. The unique wear-resistance of this facing is probably attributable to the presence of its relatively high carbide content. This provides remarkable flexibility of deposited weld metal composition.

What is claimed is:

1. A hard-facing arc welding electrode consisting essentially of a stainless steel core incorporating approximately from 23–28% by weight of chromium and up to 6% of nickel, a flux coating upon said core ranging approximately from 45–50% by weight of percentage of flux relative to that of core, said flux coating incorporating active flux agents, a total carbon content in carbide and uncombined form ranging from 3–20% by weight, from 30–55% by weight of powdered metallic materials, and a binder intermixed with said flux which adheres it upon said core.

2. An electrode as set forth in claim 1 wherein said powdered metallic materials are selected from the group consisting of:
   (1) Ferrochromium
   (2) Chromium
   (3) Chromium-carbide
   (4) Manganese
   (5) Ferrosilicon
   (6) Ferrotitanium
   (7) and mixtures thereof 3. An electrode as set forth in claim 2 wherein said metallic powder consists substantially of equal amounts of chromium, chromium-carbide and manganese powders.

4. An electrode as set forth in claim 1 wherein said flux coating formulation consists essentially of the following constituents in the indicated ranges of percentages by weight:

| Constituent: | Range |
|---|---|
| (1) Titanium dioxide | 20–40 |
| (2) Alkaline earth metal carbonates | 8–20 |
| (3) A fluoride selected from the group consisting of alkali and alkaline earth metal fluorides | 10–30 |
| (4) Aluminum silicate | 0–10 |
| (5) Total carbon in carbide and uncombined form | 3–20 |
| (6) Powdered metallic alloys | 30–55 |
| (7) Silica | 6–15 |

5. An electrode as set forth in claim 4 wherein said alkaline earth carbonate consists essentially of calcium carbonate.

6. An electrode as set forth in claim 5 wherein said aluminum silicate consists essentially of bentonite.

7. An electrode as set forth in claim 1 wherein said binder consists of water-soluble silicates.

8. An electrode as set forth in claim 1 wherein said flux coating formulation consists essentially of the following constituents in the indicated ranges of percentages by weight:

| Constituent: | Range |
|---|---|
| (1) Alkaline earth metal carbonates | 15–40 |
| (2) A fluoride selected from the group consisting of alkali and alkaline earth metal fluorides | 15–40 |
| (3) Aluminum silicate | 0–10 |
| (4) Total carbon content in carbide and uncombined form | 3–20 |
| (5) Powdered metallic alloys | 30–55 |

9. An electrode as set forth in claim 8 wherein said alkaline earth metal carbonate is calcium carbonate, and said fluoride selected from the group consisting of alkali and alkaline earth metal fluorides is fluorspar.

10. An electrode as set forth in claim 1 wherein said powdered metallic materials have a particle size range of from 20 to 325 mesh.

References Cited by the Examiner

UNITED STATES PATENTS 2,024,992  12/35  Wissler et al.   117—205
2,855,333  10/58  Wasserman et al.   117—207

FOREIGN PATENTS 514,086  6/55  Canada.

RICHARD D. NEVIUS, *Primary Examiner.*